United States Patent
Agnihotram et al.

(10) Patent No.: US 9,063,856 B2
(45) Date of Patent: Jun. 23, 2015

(54) METHOD AND SYSTEM FOR DETECTING SYMPTOMS AND DETERMINING AN OPTIMAL REMEDY PATTERN FOR A FAULTY DEVICE

(71) Applicant: Infosys Limited, Bangalore (IN)

(72) Inventors: Gopichand Agnihotram, Guntur (IN); Radha Krishna Pisipati, Hyderabad (IN)

(73) Assignee: Infosys Limited, Bangalore (IN)

(*) Notice: Subject to any disclaimer, the term of this patent is extended or adjusted under 35 U.S.C. 154(b) by 247 days.

(21) Appl. No.: 13/890,337

(22) Filed: May 9, 2013

(65) Prior Publication Data
US 2013/0305081 A1 Nov. 14, 2013

(30) Foreign Application Priority Data
May 9, 2012 (IN) .......................... 1815/CHE/2012

(51) Int. Cl.
*G06F 11/00* (2006.01)
*G06F 11/07* (2006.01)
*G07C 5/08* (2006.01)
*G05B 23/02* (2006.01)

(52) U.S. Cl.
CPC .......... *G06F 11/0793* (2013.01); *G07C 5/0808* (2013.01); *G06F 11/0739* (2013.01); *G05B 23/02* (2013.01); *G05B 23/0262* (2013.01); *G05B 23/0286* (2013.01)

(58) Field of Classification Search
None
See application file for complete search history.

(56) References Cited

U.S. PATENT DOCUMENTS

| 6,076,083 | A | 6/2000 | Baker | |
|---|---|---|---|---|
| 6,748,304 | B2* | 6/2004 | Felke et al. | 701/31.6 |
| 2005/0086562 | A1* | 4/2005 | Demsky et al. | 714/100 |
| 2005/0091070 | A1* | 4/2005 | Adgaonkar et al. | 705/1 |
| 2008/0320495 | A1 | 12/2008 | Akiyama et al. | |
| 2009/0292574 | A1* | 11/2009 | Pop et al. | 705/8 |
| 2009/0306935 | A1* | 12/2009 | Hamilton et al. | 702/184 |
| 2010/0083049 | A1 | 4/2010 | Miki | |
| 2010/0229044 | A1* | 9/2010 | Fountain et al. | 714/37 |
| 2011/0099039 | A1 | 4/2011 | Bovey | |
| 2012/0215398 | A1* | 8/2012 | Chen et al. | 701/31.6 |
| 2013/0198556 | A1* | 8/2013 | Kolbet et al. | 714/2 |
| 2014/0039648 | A1* | 2/2014 | Boult et al. | 700/79 |
| 2014/0089054 | A1* | 3/2014 | Knapp et al. | 705/7.35 |
| 2014/0208150 | A1* | 7/2014 | Abuelsaad et al. | 714/2 |
| 2014/0289418 | A1* | 9/2014 | Cohen et al. | 709/226 |

OTHER PUBLICATIONS

Verron, S., et al., "Fault detection of univariate non-Gaussian data with Bayesian network", IEEE International Conference on Industrial Technology (ICIT'10) (2010), version 1-13, pp. 1-6, Angers, France.
Tessella, "Bayesian Statistics", Technical Supplement, V2.R1.M0, Jun. 2009, pp. 1-8.

* cited by examiner

*Primary Examiner* — Gabriel Chu
(74) *Attorney, Agent, or Firm* — LeClairRyan, a Professional Corporation (57) ABSTRACT

Computer-implemented systems, methods, and computer-readable media electronic for detecting symptoms and determining an optimal remedy pattern for one or more faulty components of a device is disclosed. First the symptoms of the faulty device are detected and associated faulty components of the device are identified. Different tests are performed to confirm the status of the faulty components. Based on the historical data, cost information and remedy cost function an optimal remedy pattern is determined.

27 Claims, 10 Drawing Sheets

METHOD AND SYSTEM FOR DETECTING SYMPTOMS AND DETERMINING AN OPTIMAL REMEDY PATTERN FOR A FAULTY DEVICE

This application claims the benefit of Indian Patent Application Filing No. 1815/CHE/2012, filed May 9, 2012, which is hereby incorporated by reference in its entirety.

FIELD OF THE INVENTION

The present disclosure relates to detecting faulty components of a faulty device. In particular, the invention relates to a method for detecting one or more symptoms and determining an optimal remedy pattern for one or more faulty components of a faulty device.

BACKGROUND OF THE INVENTION

Generally, a diagnostic framework provides a way for identifying the faulty components in a device and suggesting the remedies for the faulty components. Different diagnostic frameworks are present in the market today. Typically, the diagnostic frameworks that are available for detecting the symptoms depend on knowledge base and simple mathematical models. As is widely known, the existing diagnostic frameworks predict the faulty components of a device using Bayesian Networks (BN). Further, these frameworks generally predict the repair strategy for the faulty components of a device based on cost estimation before and after carrying out repairable procedures, expected cost of repair and expected cost of repair after testing values.

The conventional approaches for detecting symptoms and determining an optimal remedy pattern for a faulty device fail in modeling noise in the sensor data accurately and hence, lack relationship between the symptoms and faultiness of the components. This noise, which may be due to environmental factors or unreliability in the components, can infect the true readings from the device, and can corrupt the data to such an extent that it might indicate a fault erroneously. Further, the noise can also mask true faults. Additionally, the existing framework is not generic for different types of devices such as medical devices, communication devices, electronic devices and the like.

Therefore, there is a need for a robust statistical model that can determine sensor data from sensors indicating 'true faults' in the device and suppress the false indications due to noise, thereby establishing a true relationship between the symptoms and faultiness of the components. Further, there is a need for a framework that is generic for different type of devices.

SUMMARY OF THE INVENTION

The present disclosure discloses a method for detecting one or more symptoms and determining an optimal remedy pattern for one or more faulty components of a device. First, the symptoms of the faulty device are detected and associated faulty components of the device are identified. Different tests are performed to confirm the status of the faulty components. Based on the historical data, cost information and remedy cost function, an optimal remedy pattern is determined. In one embodiment, the status of the faulty device is checked after remedying every faulty component following the optimal remedy pattern.

Further, the disclosure discloses a method for identifying faulty components of a device. The method comprises the steps of obtaining one or more control samples of the faulty device data when the faulty device operates in a no-fault mode. Sensor data under condition monitoring is obtained and an exploratory data analysis is performed on the control samples and the sensor data. The measurement error model is used on the sensor data for identifying the error in the measured sensor data. Subsequently, the sensor data is described using a multivariate probability distribution wherein one or more parameters of the multivariate probability distribution are estimated by a maximum-likelihood estimation technique. The sensor data is compared with the control samples using a likelihood ratio test and the sensor data that indicates the one or more faulty components is determined.

Further, the disclosure discloses a method for determining an optimal remedy pattern for the faulty components of a device. First, the symptoms of the faulty device and associated faulty components of the device are identified. Then, the status of the faulty device is checked by a probabilistic engine. Thereafter, a remedy cost with testing and a remedy cost without testing are computed based on cost information of the system. The optimal remedy pattern is determined using the remedy cost with testing, if the remedy cost with testing is less than the remedy cost without testing, otherwise, the optimal remedy pattern is determined using the remedy cost without testing, if the remedy cost with testing is more than the remedy cost without testing. After the optimal remedy pattern is determined, the historical data of the probabilistic engine is updated with the determined optimal remedy pattern.

Furthermore, the disclosure discloses a remedy system for detecting symptoms and determining an optimal remedy pattern for the faulty components of a device. The remedy system comprises a symptoms detection and analysis module for detecting the symptoms in the faulty device and determining the faulty components based on the detected symptoms. The remedy system further includes an activity discovery module for extracting historical data of the faulty device stored in a database. A testing module of the remedy system performs one or more tests on the determined faulty components to confirm the faulty components and checks the status of the faulty device. The optimal remedy pattern module determines the optimal remedy pattern for the detected symptoms based on the extracted historical data, a cost information, a remedy cost without testing and a remedy cost with testing. Further, the remedy module comprises an action module that remedies the one or more faulty components following the optimal remedy pattern and check the status of the faulty device after remedying every faulty component following the optimal remedy pattern.

Further, the disclosure discloses a symptoms detection and analysis system that comprises a control sample database, an exploratory data analysis module, a condition monitoring module, a measurement error model module, a maximum likelihood estimator, a likelihood ratio testing module and a determining module. The control sample database stores the control samples of the faulty device data when the system operates in a no-fault mode. The exploratory data analysis module performs exploratory data analysis on the control samples and sensor data. The condition monitoring module obtains the sensor data under condition monitoring and performs condition monitoring on the sensor data. The measurement error model module uses measurement error model on the sensor data. The maximum likelihood estimator describes the sensor data using a multivariate probability distribution wherein one or more parameters of the multivariate probability distribution are estimated by a maximum-likelihood estimation technique. The likelihood ratio testing module compares the sensor data with the control samples using a likelihood ratio test. The determining module determines the sensor data that indicates the one or more faulty components.

Further, the disclosure discloses a optimal remedy pattern system that comprises a probabilistic engine, a calculating module, a processing module and a remedying module. The probabilistic engine receives the symptoms of a faulty device, identifies one or more faulty components associated with each symptom and determines the device status. The calculating module computes a remedy cost with testing and a remedy cost without testing based on cost information of the device. The processing module determines the optimal remedy pattern using the remedy cost with testing if the remedy cost with testing is less than the remedy cost without testing, otherwise, determines the optimal remedy pattern using the remedy cost without testing if the remedy cost with testing is more than the remedy cost without testing. The remedying module updates historical data of the probabilistic engine with the determined optimal remedy pattern.

DETAILED DESCRIPTION OF THE INVENTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings. While the invention described herein is provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof.

Figure 1:
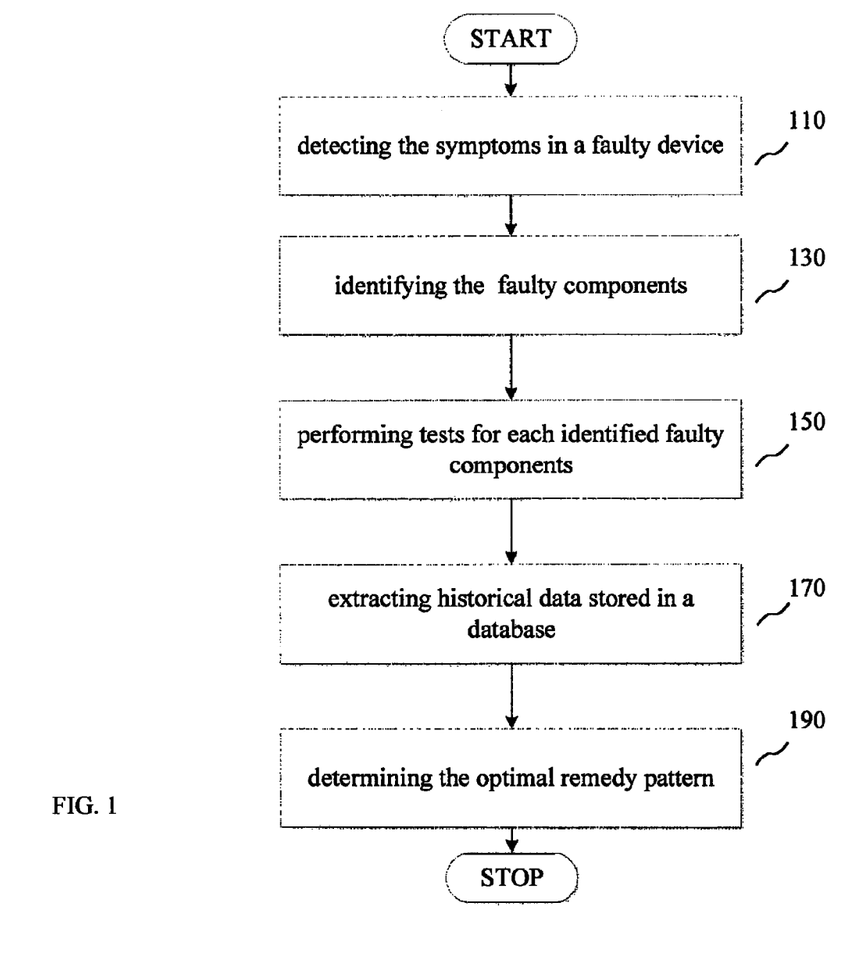
FIG. 1 is an illustrative diagram depicting the manner for detecting one or more symptoms and determining an optimal remedy pattern for one or more faulty components.

FIG. 1 is an illustrative diagram depicting the manner for detecting one or more symptoms and determining an optimal remedy pattern for one or more faulty components of a faulty device. Generally, a device refers to an organized arrangement of components working together such as vehicles, medical systems, computing systems, electronic systems etc. Typically, a device works normally if all the components of the device are working normally, and if any of the components in the device is in a failure state, the device exhibits fault.

When the device is in a faulty state, the symptoms indicating the faults in the device are detected at step 110. The symptoms are detected using various statistical methods and a probabilistic engine as described in details below. Based on the detected symptoms, the faulty components are identified at step 130. At step 150, the tests that can confirm the diagnosis and check the status of faulty components are performed on the identified faulty components. After the faulty components are confirmed, historical data is extracted from a database at step 170. As used herein, the historical data refers to the data of the device regarding the symptoms detected, the faulty components associated with each of the symptoms, remedy patterns determined corresponding to the detected symptoms, and the optimal remedy pattern used on the faulty components. Based on the historical data, cost information, remedy cost without testing and remedy cost with testing, an optimal remedy pattern for the faulty components is determined at step 190. The details of the determination of optimal remedy pattern are described below.

Cost information herein refers to cost that can be incurred to identify and remedy the faulty components. The cost information may include, but is not limited to, renew cost for the faulty component, observation cost for the faulty components, observation cost for the fault device, investigation cost and the like.

Figure 2:
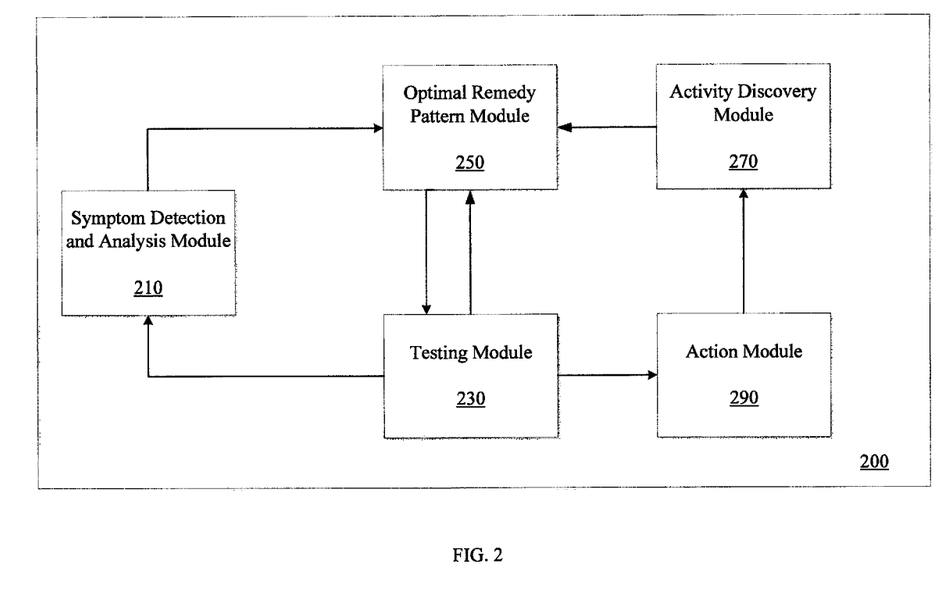
FIG. 2 is a block diagram illustrating the details of a remedy system for detecting symptoms and determining optimal remedy pattern for the faulty components of a faulty device in which several aspects of the present disclosure can be implemented.

FIG. 2 is a block diagram illustrating the details of a remedy system for detecting symptoms and determining optimal remedy pattern for the faulty components of a faulty device. The remedy system 200 comprises a symptom detection and analysis module 210, a testing module 230, an optimal remedy pattern module 250, an activity discovery module 270, and an action module 290.

The symptom detection and analysis module 210 identifies the symptoms in the sensor data associated with the components in the device using statistical models and sends information to optimal remedy pattern module 250. The activity discovery module 270 discovers the remedial patterns from the historical data and passes the information to the optimal remedy pattern module 250. Optimal remedy pattern module 250 determines the optimal remedy pattern based on historical data, cost information, remedy cost without testing and remedy cost with testing. The testing module 230 analyzes the device condition for each remedy associated with the symptoms. If the device is working, then no action is taken, otherwise, the testing module 230 remedies another component supported by the optimal remedy pattern. The testing module 230 provides the final remedial activity to the action module 290. The action module 290 sends the final remedial pattern information to the activity discovery module 270 to update historical data.

Figure 3:
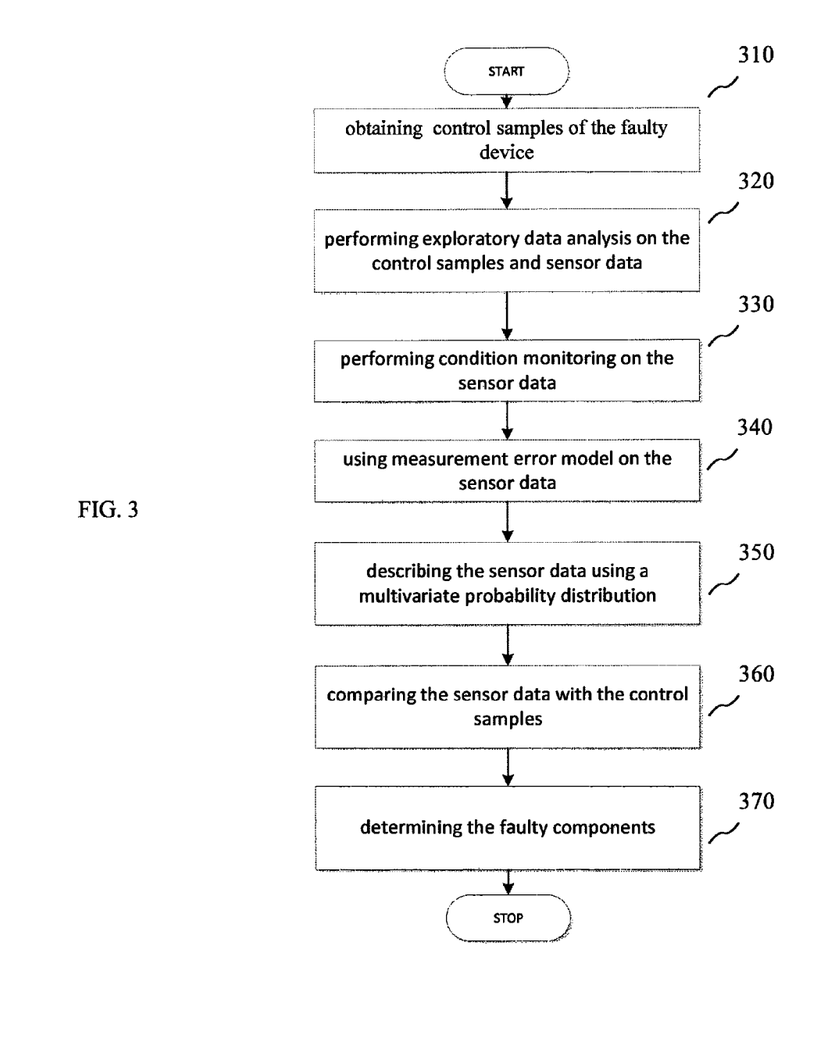
FIG. 3 illustrates a process for identifying one or more faulty components of a faulty device according to an aspect of the present disclosure.

FIG. 3 illustrates a process for identifying one or more faulty components of a faulty device. In order to identify the true faulty components, first step would be to flag those sensors that are indicative of a fault in the device by identifying the symptoms in the sensor data using statistical methods.

Here, the statistical approach is based on notion of "control samples" of sensor data. The control samples may be obtained under carefully monitored operating conditions when the device is known to be operating in the no-fault mode at step 310. These samples are validated using a behavioral model of the device, and can be stored in a database.

Given this control sample database, sensor-data from real-life device operation can be collected from the sensors attached/used with the components of the device and compared with data from the control samples for the appropriate operating condition by using a measurement-error-model motivated by extensive exploratory data analysis. An associated significance test is used to implicate sensors pointing to the device-fault. An exploratory data analysis of sensor data and control samples is performed at step 320. During the exploratory data analysis, the influence of additive and multiplicative errors on both the control samples and sensor data are quantified. For instance, larger sensor measurements may have a proportionately larger error over repeated samples. At step 330, condition monitoring is performed on the sensor data followed by using measurement-error-model on the data (340). Consequently, the sensor data is described by a multivariate probability distribution whose parameters are to be estimated by maximum-likelihood estimation technique (350). In applications such as condition-monitoring, where repeat data is available, small-sample bias of maximum likelihood technique is alleviated. Further, the maximum-likelihood estimation framework may be used to place a confidence interval. After the parameters have been determined for a given set of sample data, sensors that point to a fault in the device are identified. In an embodiment, this is done by comparing the sensor data with the control samples using a statistic such as likelihood ratio test (360). The likelihood ratio test is used to identify the sensors indicates the faults in the components. Determine if the sensor points to the device fault (370).

Figure 4:
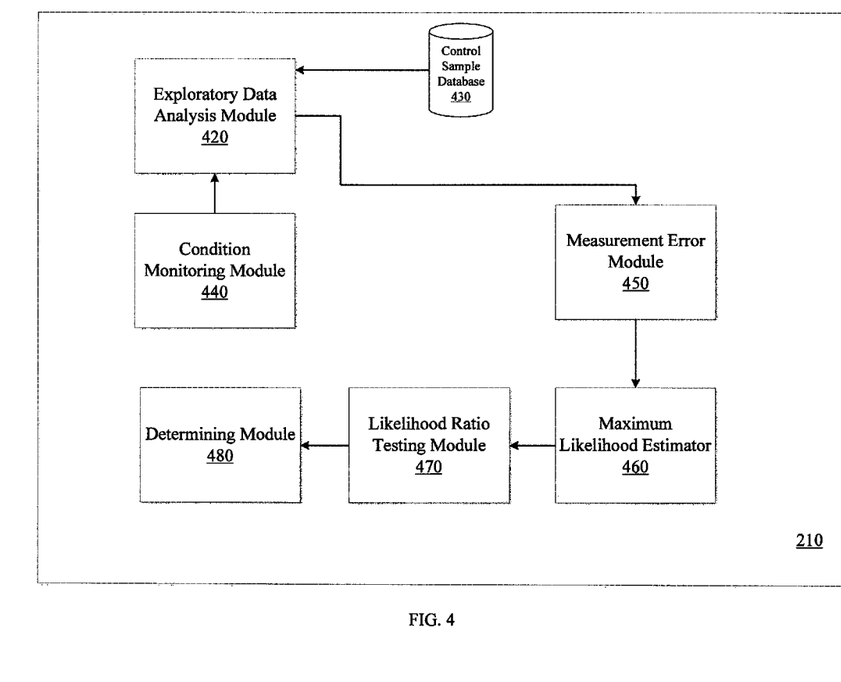
FIG. 4 is a block diagram illustrating the details of a symptoms detection and analysis system for identifying one or more faulty components of a faulty device.

FIG. 4 is a block diagram illustrating the details of a symptoms detection and analysis system for identifying one or more faulty components of a faulty device. The symptoms detection and analysis system 210 comprises an exploratory data analysis module 420, a control sample database 430, a condition monitoring module 440, a measurement error module 450, a maximum likelihood estimator 460, a likelihood ratio testing module 470 and a determining module 480.

Using sensor data, the symptom detection and analysis system 210 identifies the components that are faulty. As used herein, the sensor data refers to the data received directly or derived from the physical sensors used in a device. Exploratory data analysis module 420 performs exploratory data analysis on the sensor data and the control samples. The control samples may be obtained under carefully monitored operating conditions when the device is known to be operating in the no-fault mode. The details of exploratory data analysis are explained below:

Exploratory Data Analysis (EDA):

The exploratory data analysis is extensively applied herein on sensor data and control samples as pre-processing of the data. There are different characteristics in EDA such as finding the outliers, obtaining the missing values, correlation among the sensor variables, transformations and others.

Outliers: Outliers in the data are identified using different plots such as probability plot, histogram, scatter plot, box-plot, pie-chart and the like.

Missing Values: EDA analysis may detect the missing values in the data by interpolating and extrapolating the data using selection of appropriate mathematical function such as linear or non-linear, or statistical models (linear, quadratic, non-linear Regression or others) based on the nature of the data.

Correlation Analysis In EDA, correlation analysis is used to predict the correlation among the sensor variables. It may find the dependency among the sensor variables such as the variables that are dependent variables and independent variables.

Transformation: The normality test for the data using Kolmogorov test etc. can be performed to capture the entire information in the data. Transformation such as logarithmic, exponential, etc. can also be performed to bring the data to stationary.

Condition monitoring module 440 obtains the sensor data under condition monitoring. The condition monitoring generally refers to a procedure to observe the sensor data to monitor the change in the data when the device is working in no-fault mode. The condition monitoring sensor data is sent to exploratory data analysis module 420 for preprocessing of the data.

After the sensor data and control samples are pre-processed at the exploratory data analysis module 420, the measurement error model module 450 models the sensor data. The details of measurement error model are explained below:

Measurement Error Models:

After exploratory data analysis on the sensor data, the measurement error models are used on sensor data for identifying the error in the measured sensor data with respect to the control samples. There are different types of measurement error models, a few of which are given below:

Two Variable Measurement Error Model is Given as $$Y_t = \beta_0 + \beta_1 X_t + e_t; \quad X_t = x_t + u_t$$

Here, $Y_t$ is a dependent variable, $X_t$ is an independent variable and the sensor data is collected at time t. $x_t$ is the input data collected at time t.

$e_t$, $u_t$ are error variables and it follows normal distribution with mean zero and variance 1.

$\beta_0$, $\beta_1$ are the coefficients and maximum likelihood estimation method may be used to estimate these parameters.

Three Variable Measurement Error Model is Given by $$Y_{t_1} = \beta_{01} + \beta_{11} X_t + e_{t_1}; \quad Y_{t_2} = \beta_{02} + \beta_{12} X_t + e_{t_2}; \quad X_t = x_t + u_t$$

Here $Y_{t_1}$, $Y_{t_2}$ are dependent variables and data is collected at times respectively;

$X_t$ is an independent variable; $x_t$ is the input data collected at time t.

$e_{t_1}$, $e_{t_2}$, $u_t$, are error variables and data is collected at times $t_1$, $t_2$, t respectively and it follows normal distribution with mean zero and variance 1.

$\beta_{01}$, $\beta_{11}$, $\beta_{02}$, $\beta_{12}$, are the coefficients, and maximum likelihood estimation method may be used to estimate these parameters in the model.

Although two examples of measurement error models are explained above, it will be appreciated by the skilled person that other measurement error models can also be used.

Maximum likelihood estimator 460 applies the maximum likelihood estimation method on the data for estimating the parameters. Accordingly, the sensor data may be described by a multivariate probability distribution whose parameters are to be estimated by maximum-likelihood estimation technique. Further, the maximum-likelihood estimation framework can be used to place a confidence interval. After the parameters have been determined for a given set of sensor data by maximum likelihood estimator 460, likelihood ratio testing module 470 identifies sensors that point to a fault in a statistically significant sense by comparing the sensor data with the control samples using statistic such as the likelihood ratio test. The likelihood ratio test is used to identify the sensors which are having faulty??. Determining module 480 determines the faulty components in the device based on the sensors identified indicating the faults.

Figure 5:
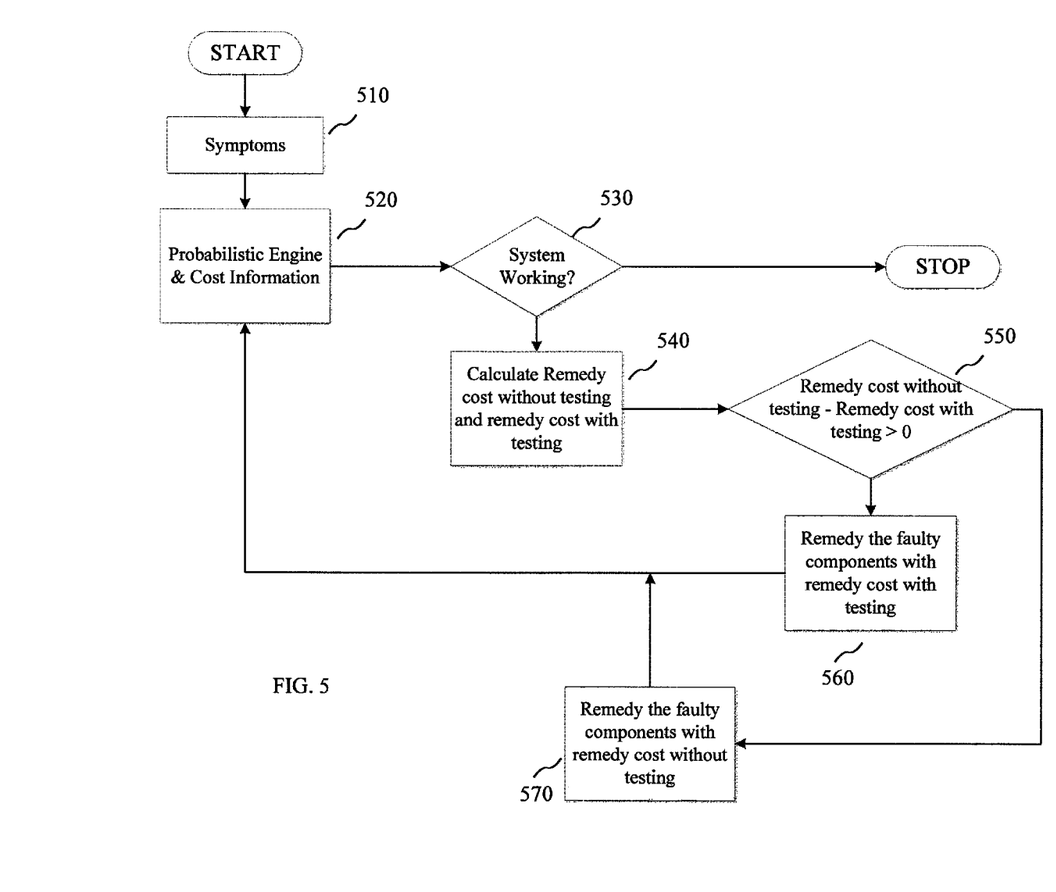
FIG. 5 illustrates a process for determining an optimal remedy pattern for the faulty components of a device according to an aspect of the present disclosure.

FIG. 5 illustrates a process for determining an optimal remedy pattern for the faulty components of a device according to an aspect of the present disclosure. The symptoms and the faulty components of a device are identified (as explained in conjunction with FIGS. 3 and 4) at step 510. The status of the device is checked by using a probabilistic engine at step 520. The device working condition in the initial stage is checked (530), if the device is working then problem is resolved otherwise remedy cost without testing and remedy cost with testing are calculated using the probabilistic engine and cost information at step 540. After obtaining the remedy cost without testing (P) and remedy cost with testing (Q) values, it is checked whether P−Q>0 at step 550. The remedy cost without testing and remedy cost with testing are calculated using remedy cost without testing function and remedy cost with testing function as explained subsequently. If the remedy cost without testing is more than the remedy cost with testing, the optimal remedy plan with lowest remedy cost with testing value among all the tests conducted on the device at step 560 is performed. If the remedy cost without testing is less than the remedy cost with testing, then the device with the ordered faulty components provided by the remedy cost without testing function is remedied at step 570. After each remedy, the device is updated and the device condition is checked using the testing module to obtain the device condition. The device can be updated dynamically for each remedy and tests conducted on the device.

Figure 6:
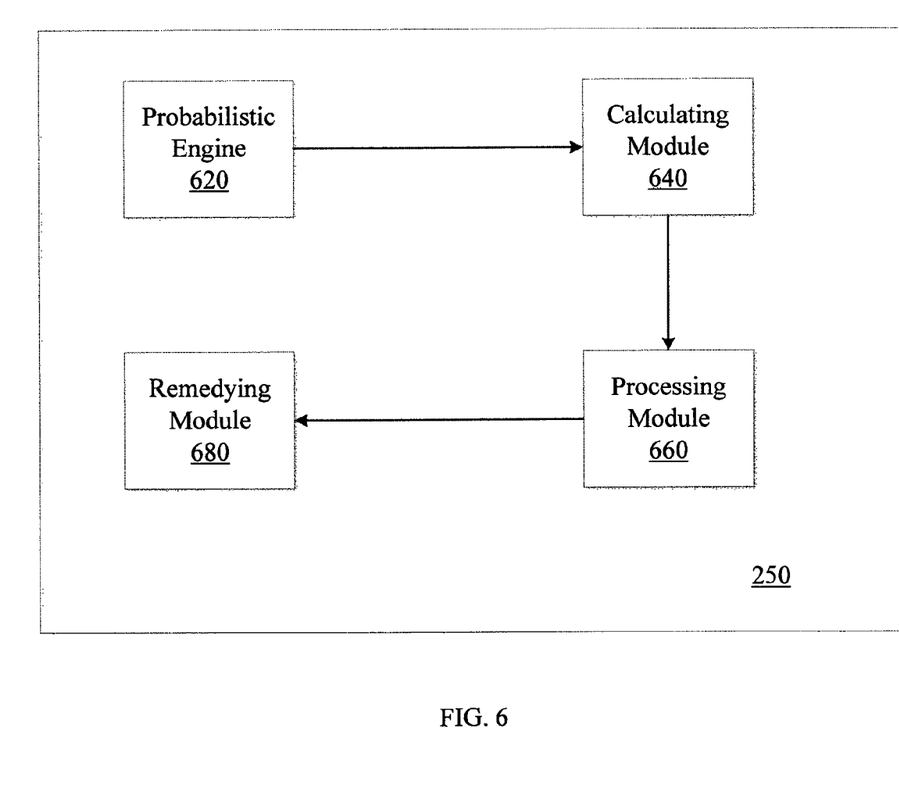
FIG. 6 is a block diagram illustrating the details of an optimal remedy pattern system for determining an optimal remedy pattern for one or more faulty components of a faulty device.

FIG. 6 is a block diagram illustrating the details of an optimal remedy pattern system for determining an optimal remedy pattern for one or more faulty components of a faulty device. The optimal remedy pattern system 250 comprises a probabilistic engine 620, a calculating module 640, a processing module 660 and a remedying module 680.

Probabilistic engine 620 refers to an engine used to check the status of the device and also used to calculate the remedy cost with testing and remedy cost without testing. In an embodiment, the probabilistic engine 620 comprises information related to the device, domain knowledge, and historical information about the components of the device. Based on domain knowledge and historical information, the probabilistic engine computes device condition and provides input for computing remedial cost functions such as remedy cost with testing function and remedy cost without function. The probabilistic engine may use any known statistical models and probabilistic networks to compute the remedial cost functions. Probabilistic networks include, but are not limited to Bayesian networks, neural networks, decision trees, hidden Markov models, graphical networks, and so forth. Meta heuristics may be genetic algorithms, simulated annealing and the like. Optimization models may be linear and nonlinear optimization techniques such as simplex, Karush-Kuhn tucker methods, Lagrangian methods and the like. The selection of probabilistic network, meta heuristic technique and optimization model may be based on the domain of the interest and nature of the data.

In one embodiment, the computation in the probabilistic engine is explained based on Bayesian networks (BN). It will be appreciated that a person skilled in the art can perform the computations based on other networks as well. The Bayesian network modeling is described below.

Figure 7:
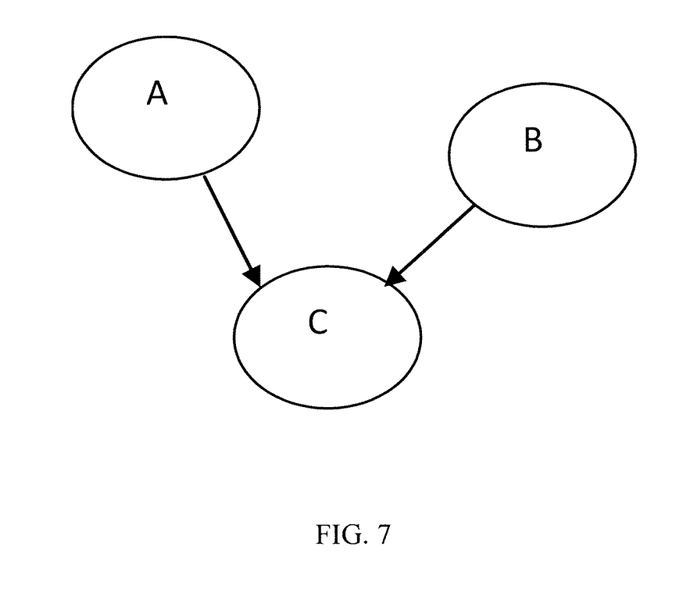
FIG. 7 is a sample Bayesian network.

Bayesian Networks Modeling:

A sample Bayesian network is shown in FIG. 7. A Bayesian network is a probabilistic directed acyclic graph, where each node is a random variable and edges represents dependencies among the variables. The nodes A, B, C are random variables and C depends on A and B. Hence C is a dependent variable and A, B are independent variables.

Bayesian network modeling depends on three features:

1. Structure: Learning the Bayesian network structure is very important in the Bayesian network modeling. The structure is based on the cause and effect relationship or dependency among the variables. There are different ways of learning structure, one way is domain expert guiding in constructing network, another way is based on the data and statistical methods (correlation analysis) to build the cause and effect relationship. The structure learning can also take combination of both.
2. Parameters: The other feature is the parameters, where each node in the network is conditionally distributed by its parents. The nodes with no parents, prior probabilities are used. Historical data is used for learning parameters in the network. The "Maximum Likelihood Estimation" (MLE) method is applied on the data for estimating the parameters. Hence for each node there will be condition probability table associate in it.
3. Inference: The final step in the Bayesian network modeling is predicting the posterior probability or inference the Bayesian network in probabilistic way. We use standard algorithms such as Junction tree algorithm (J-tree) or Variable elimination method (VLM) for inference in the Bayesian network.

Calculating module 640 is configured to compute the remedy cost with testing and remedy cost without testing based on cost information.

Cost Information:

Different types of costs are incorporated while calculating "remedy cost without testing" and "remedy cost with testing" functions. The different types of cost include, but are not limited to:

1. Remedy cost: If the component is remediable, then remediable cost is used to remedy the component.
2. Renew cost: If the remediable component cost is higher than the renewing component cost, then the component is renewed instead of remedy.
3. Investigation cost: Investigation cost is the cost incurred for investigating the component. It is used when the component is renewed or remedied recently and if the component lies in the optimal remedy pattern, then the component is investigated instead of going for remedy or renew the same component.
4. Observation/testing cost: Observation cost is the device or component observing cost after each remedy or renew. Testing cost is the cost associated with the test components in the device.

Formulation of Remedial Cost Functions:

A person skilled in the art will recognize that the below calculation is one example for the calculation of remedial cost function. It will be appreciated that other methods can be used to calculate the remedial cost function.

"Remedy cost without/with testing" functions use probabilistic engine and cost information in obtaining the optimal remedy pattern. A remedy pattern herein refers to an order of faulty components in which the components are remedied in the device. After each successive remedy, the device condition is analyzed using device testing module 230, if the device is working then we stop the remedy otherwise we remedy the next component as per the remedy pattern. For each remedy there is a cost associated with it. The optimal remedy pattern is the one with least average cost.

Notations:
Y: Device status before remedy
$C_j$: Component j
j: 1, 2, ..., k
i: 1, 2, ..., n
n: Total number of tests performed in the device
X: $X_1, X_2, \ldots, X_n$; Tests that are performed in the device
$c_j$: Cost of remedy of component j
$c_j^o$: Observation cost of the component j
$c_s$: Device observing cost
$c_{X_i}$: Cost corresponding to performing the test $X_i$; i=1, 2, ..., n.
$Y_j$: The device status after remedying the component j
D: Damage (faulty) condition or not working state of the component or device
ND: Not damage (not faulty) condition or working state of the component or device
S: The ordered remedy activities of components
$S_j$: The ordered remedy activities till the components j and accommodating the remedy of component j
$T=(C_1, C_2, \ldots C_k)$: remedy pattern of ordered faulty components at which the components are remedied in the device
P: Probability
$R_s$: Reliability of the device at one unit of time
$R_j$: Reliability of the component j
$\lambda_j$: The failure rate for the component j Assumptions:
1. Device works normally if all the components in the device works, if any of the component are in failure state then the device is also in failure state.
2. For the description of "Remedy cost without testing" and "Remedy cost with testing", only observation cost, remedy cost of the components and observation cost of the device are considered. Other costs such as investigation cost and the like are not considered here.

Below, the computation of two cost functions is presented.

Remedy Cost without Testing:

We use "Remedy cost without testing" in obtaining the optimal remedy pattern. The optimal remedy pattern is nothing but the least average cost of remedy over all the ordered remedy activities. The formula for the "Remedy cost without testing" for the remedy pattern $T=(C_1, C_2, \ldots, C_k)$ is given below $$\text{Remedy Cost without testing}(T = (C_1, C_2, \ldots, C_k)) =$$
$$c_s \cdot P(Y = D) + (c_1^o + (c_1 + c_s)P(Y_1 = D | S_1)) + ((1 - P(Y_1 = D | S_1)))$$
$$c_2^o + P(Y_2 = D | S_2)(c_2 + c_s)) +$$
$$\begin{pmatrix} (1 - P(Y_1 = D | S_1) - P(Y_2 = D | S_2))c_2^o + \\ P(Y_3 = D | S_2)(c_3 + c_s) \end{pmatrix} + \ldots +$$
$$\begin{pmatrix} (1 - P(Y_1 = D | S_1) - P(Y_2 = D | S_2) - \ldots - P(Y_k = D | S_k))c_k^o + \\ P(Y_k = D | S_k)(c_k + c_s) \end{pmatrix}$$

where P(Y=D) is the prior probability that the device is in failure state before remedying the components and $P(Y_j=D|S_j)$ for j=1, 2 ... k is the probability that the device is in failure state after remedying the component j given the evidence that till the component j and accommodating remedy of component j. These probabilities can be obtained using the probabilistic engine. Here Bayesian networks are used as an example in the probabilistic engine and Bayesian network inference is used to obtain these probability values. It will be appreciated by a skilled person that any other network can be used in the probabilistic engine.

Another embodiment to compute P(Y=D) and $P(Y_j=D|S_j)$: Reliability models may also be used to compute the probability of device or component failure. It is assumed that the device works normally if all the components in the device are working normally, if any of the components is in failure state, the device fails. The reliability of the device can be expressed as the reliability of its components which is given by $$R_s = R_1, R_2, R_3 \ldots R_k$$

where $R_j$ is the reliability of the component j for each j=1, 2 ..., k.

In case the component failure is exponentially distributed with failure rate $\lambda_j$ then the reliability of the device is given by, $R_s = \exp(-\Sigma_{j=1}^k \lambda_j)$; Here failure rate is obtained from failure history of each component. From this reliability of the device, the probability of the component in failure state and probability of device in failure state are obtained.

Remedy Cost with Testing:

Remedial pattern $T=(C_1, C_2, \ldots, C_k)$ is the ordered components at which the components are remedied. We choose relevant tests $X_1, X_2, \ldots, X_n$ corresponding to these components (choosing suitable tests is subjective information). The tests are performed in the device, because of these tests the order won't be the same as given in T. The performance of the tests on the component may indicate a fault or the component may not indicate a fault given the evidence that the components are observed/remedied.

The probability that the tests $X_i$ indicate a fault (F) given the evidence (e) (remedy activities of the components) is denoted by $P(X_i=F|e)$; and the probability that the tests do not indicate a fault (NF) given the evidence is denoted by $P(X_i=NF|e)$ On performing tests on the remedy pattern T, if the test $X_1$ tells that there is an indication of fault in the component $C_4$ or $C_5$, then the remedy pattern changes to $T_1=(C_4, C_5, C_1, C_2, C_3, C_6, \ldots, C_k)$. If the test $X_1$ does not indicate the fault, then the remedy pattern changes to $T_2=(C_1, C_2, C_3, C_6, C_7, C_8, \ldots, C_k, C_4, C_5)$. The "remedy cost with testing" function is given below, $$\text{Remedy cost with testing}(X=(X_1, \ldots, X_k))=C_{X_1}+P(X_1=F|e)L(T_1)+P(X_1=NF|e)L(T_2).$$

If there is another test $X_2$ which indicates the fault in the components $C_7$ or $C_8$ then the remedy pattern changed to $T_3=(C_4, C_5, C_7, C_8, C_1, C_2, \ldots, C_k)$. If it does not indicate the fault then the remedy pattern changes to $$T_4=(C_1, C_2, C_3, C_6, \ldots, C_k, C_4, C_5, C_7, C_8).$$

$$\text{Remedy cost with testing}(X = (X_1, \ldots, X_k)) =$$
$$C_{X_1} + C_{X_2} + P(X_1 = F | e)L(T_1) + P(X_1 = NF | e)L(T_2) +$$
$$P(X_2 = F | e)L(T_3) + P(X_2 = F | e)L(T_3).$$

Where L=Remedy cost without testing function

Likewise, suitable tests may be used to test the components in the system. Once the tests are included in the system, then the remedy pattern may change based on the test results provided. The probabilities $P(X_i=F|e)$, $P(X_i=NF|e)$; for each i=1, 2 ... n can be obtained from the probabilistic engine. If we are using BN in probabilistic engine, then we will use Bayesian network inference to compute these probabilities. We can also use reliability models (explained above) alternatively to compute these probabilities.

In one embodiment, investigation cost is accrued by investigating the component $C_i$ and check what state it is, if the component is not faulty state, then we do not have to take any action to fix the component, but there will be investigation cost associated within it which can be stated as $c_j^{Inv}$.

In another embodiment, the independent fault components and dependent fault components functions to obtain optimal remedy scheme may be derived based on the cost function.

Processing module 660 determines the optimal remedy pattern based on the above computed cost functions. Along with these functions, the domain expert knowledge and expenditure to arrive at remedial activities can also be considered. Based on the domain expert knowledge, the severity of the components can be determined. The level of severity defines the option in the inclusion and computing the cost of remedy. It can be taken as on a pre-defined levels (say 1 to 5: one is lowest and 5 is highest) and an alpha-cut (between the levels) to decide the mandatory components for remedial action irrespective of cost. Lower severity components can be considered based on the expenditure and domain expert choice.

Processing module 660 determines the optimal remedy pattern using the remedy cost with testing when the remedy cost with testing is less than the remedy cost without testing; otherwise the optimal remedy pattern determination is based on the remedy cost without testing provided the remedy cost with testing is more than the remedy cost without testing.

Remedying module 680 updates the optimal remedy determined and takes corresponding action on the device in the database storing the historical data of the components of the device. This data may be used to carry out association mining to discover associations between symptoms and the components on which the action was taken. These associations may be helpful in arriving or updating the diagnosis of symptoms and/or remedial pattern for incoming symptoms.

The process of identifying faulty components and determining optimal remedy pattern as described above is explained below with an example embodiment of starting mechanism in an automobile device.

Figure 8:
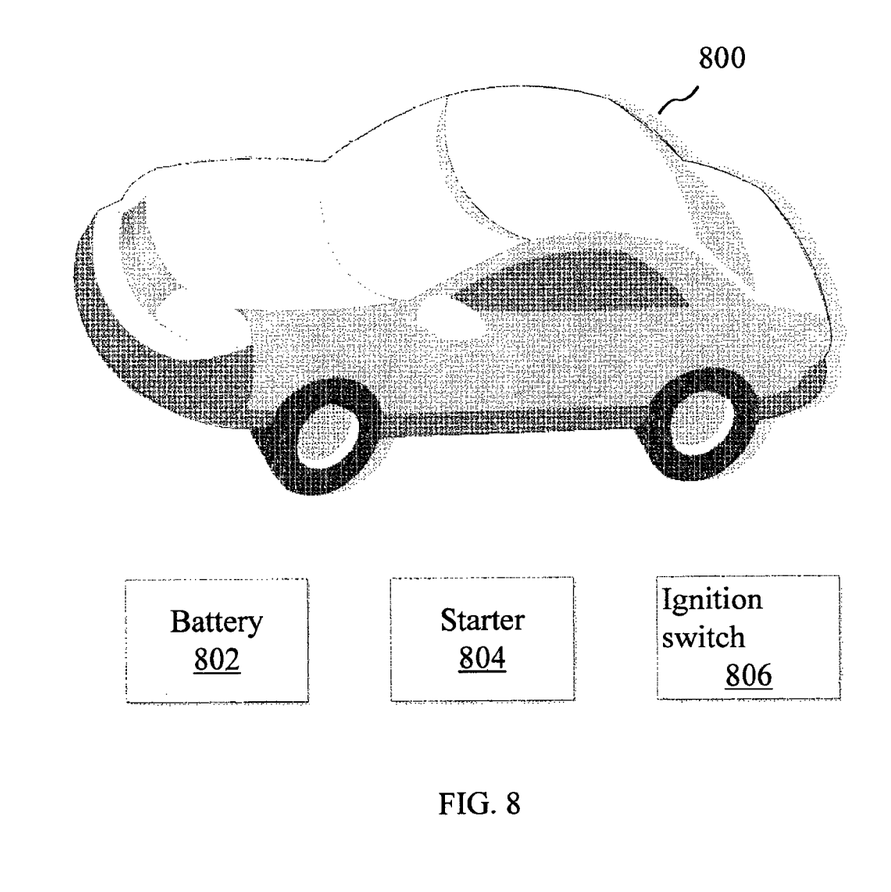
FIG. 8 is an example embodiment showing an automobile and its components.

FIG. 8 is an example embodiment showing automobile 800 and its components. The components of automobile 800 shown in FIG. 8 comprise a battery 802, a starter 804 and an ignition switch 806. The components shown here are related to the starting mechanism of automobile 800. It will be appreciated by the skilled person that many other components can also be related to the starting mechanism of automobile 800 and the components shown in FIG. 8 are only for the purpose of illustration.

Figure 9:
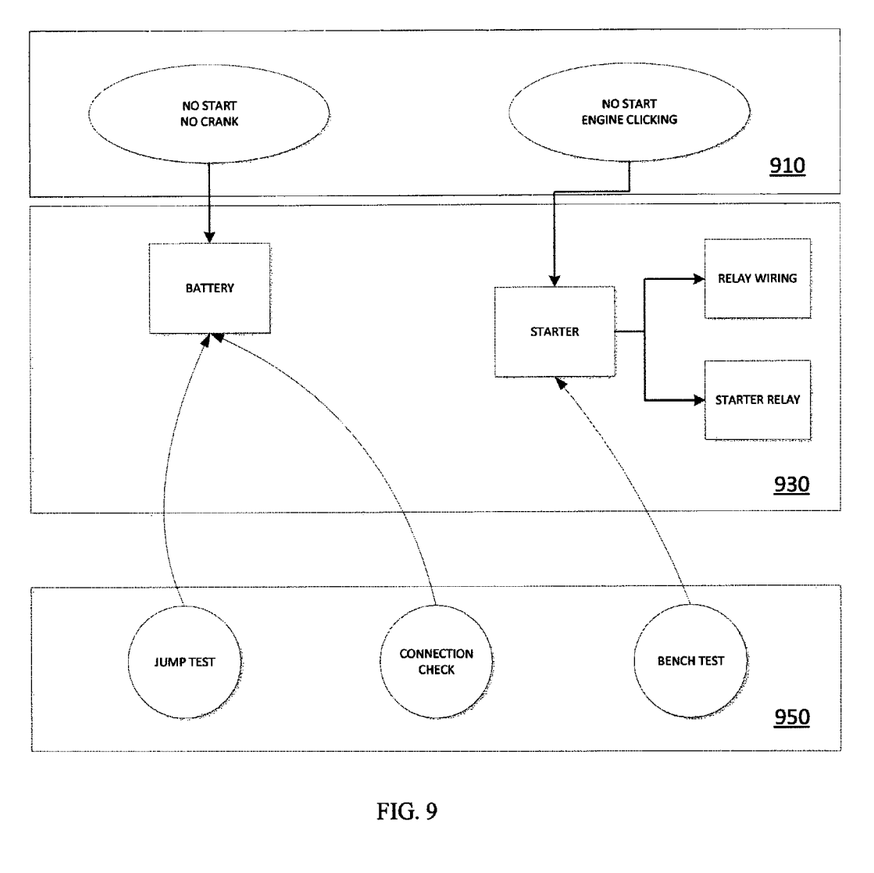
FIG. 9 is an example embodiment according to an aspect of the present disclosure.

FIG. 9 is an example embodiment according to an aspect of the present disclosure. FIG. 9 shows the process of identifying faulty components and determining optimal remedy pattern for the components of automobile 800 shown in FIG. 8. The process follows the following steps:

Define the cause-effect relationships using correlation analysis among variable of interest and build Bayesian Network: Based on domain knowledge or historical data of the components Bayesian network structure is obtained. From the historical data use some statistical models such as correlation analysis to construct cause-effect relationship among the components to build the Bayesian network structure.

In automobile 800, the starting mechanism with few components is shown in FIG. 9. FIG. 9 shows three types of network nodes: symptom nodes 910, components nodes 930 and test nodes 950.

Symptoms: The automobile starting mechanism may show symptoms such as "No start No crank", "No start: Engine clicking", "No start: No noise", "No fuel", "No compression", "No start: Engine back firing", "Major vacuum leak", "No spark" etc. Symptoms are identified in the automobile using Symptom detection and analysis module described above. For the purpose of illustration, symptoms "No start No crank" and "No start: Engine clicking" are shown in symptom node 910.

Components: Automobile 800 consists of a number of components such as Battery, Starter, Relay wiring, Starter Relay, Brake pedal switch, Clutch pedal switch, Sparkplug, Fuel filter, Fuel pump, Gas, Distributor, Camshaft, Fuel Injector, Safety switch, Timing belt, Catalytic converter, Vacuum Hose etc.

Tests: The components are tested with different tests to confirm the status of the components of the automobile. The tests in the automobile starting mechanism may include, but not limited to Bench test, Jump test, Connection check, aerosol starting test, Bypass switch test, Ignition system simulator, Spark plug test, Tailpipe smell test, etc. These tests are used to check the status of one or more of the components like a weak Battery may be tested with Jump Test or a Connection check, Tail pipe smell test may confirm no compression and Bench Test is used to test the starter of the automobile.

After constructing Bayesian network structure, determine parameters of each node of the network by its parents as a conditional probability table in the network by using historical information. The determination of the parameters is explained in conjunction with the explanation of the Bayesian network modeling.

The process of identifying the symptoms using symptom detection and analysis module, and associating the components and corresponding tests with each symptom in Automobile 800 is explained below:

Symptoms causing the device behavior are identified using Symptom Detection and analysis Module. For the purpose of illustration, say symptoms such as "No start: No crank" and "No start: engine clicking" (shown in 910) are identified in automobile 800. Next step is to identify the components associate with each symptom from Bayesian Network structure or using domain knowledge or the combination of both.

No start: No crank may be due to
    A weak Battery
    A bad starter
    A faulty in Ignition switch
No start: Engine clicking may be due to
    A bad starter
No Compression may be due to
    Cam shaft
    Catalytic converter
    Timing belt
No fuel may be due to
    Major Vacuum leak
    Safety switch
    Fuel system
    Gas Once the probable faulty components are identified, identify the Tests that can confirm diagnosis using Bayesian Network structure or domain knowledge or the combination of both.

Jump test
        Test to diagnose a weak Battery
    Connection check
        Test to diagnose a weak Battery
    Bench test
        Test to diagnose starter
    Ignition system simulator
        Test to diagnose Camshaft
    Bypass switch Test
        Test to diagnose Brake pedal switch
        Test to diagnose Clutch pedal switch Cost information such as remedy cost, observation cost for the components, observation cost for the device, and cost with respect to test components (testing cost) are determined for the automobile.

After the faulty components of the automobile are identified, optimal remedy pattern is determined using optimal remedy pattern module as explained above. The optimal remedy pattern is determined based on "Remedy cost without testing", "Remedy cost with testing" functions, and cost information. In the illustration of an automobile, after symptoms, associated components and corresponding tests are identified; optimal remedy pattern based on "Remedy cost functions" and cost information.

The optimal remedy pattern for the automobile may be determined as:

<Battery, Starter, Safety switch, Fuel system, Camshaft>
The components stated in the optimal remedy pattern are remedied in the order supported by optimal remedy pattern, and the status of the components is checked using testing module 230. As per the optimal remedy pattern shown above, the battery is remedied first and the status of the automobile is checked after that. If the automobile is working fine, then no remedy is performed on further stated components, otherwise remedy the starter component and so on. The optimal remedial activities are stored in a database along with symptoms which form as historical optimal activities data.

Exemplary Computing Environment

Figure 10:
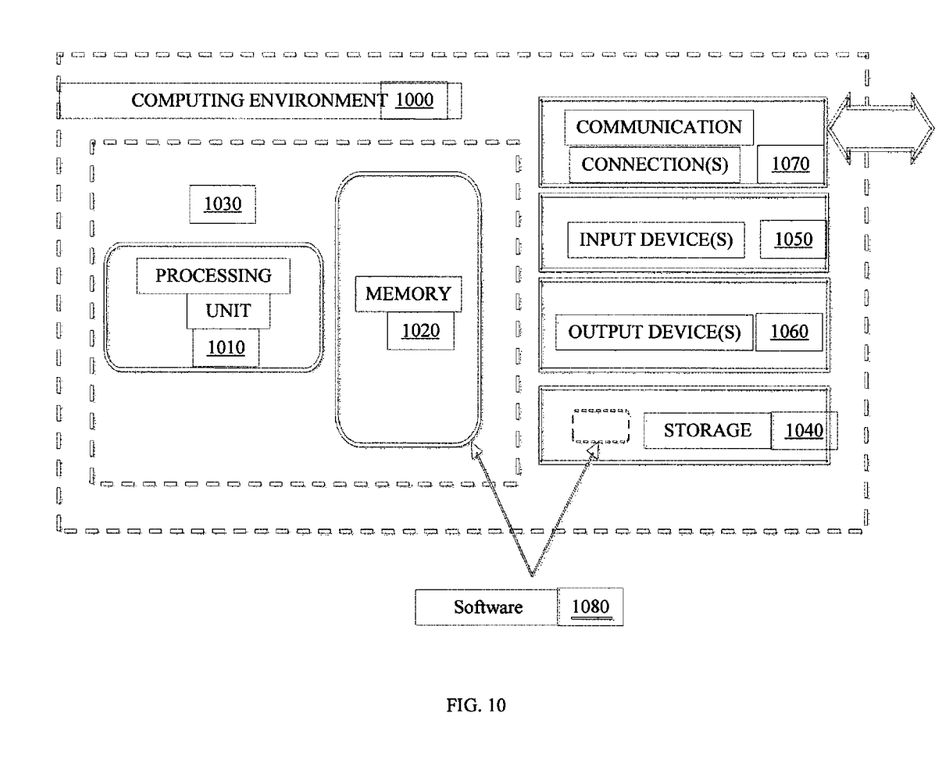
FIG. 10 is a system illustrating a generalized computer network arrangement, in one embodiment of the present technique.

One or more of the above-described techniques may be implemented in or involve one or more computer systems. FIG. 10 illustrates a generalized example of a computing environment 1000. The computing environment 1000 is not intended to suggest any limitation as to scope of use or functionality of described embodiments.

With reference to FIG. 10, the computing environment 1000 includes at least one processing unit 1010 and memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory, etc.), or some combination of the two. In some embodiments, the memory 1020 stores software 1080 implementing described techniques.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other medium which may be used to store information and which may be accessed within the computing environment 1000. In some embodiments, the storage 1040 stores instructions for the software 1080.

The input device(s) 1050 may be a touch input device such as a keyboard, mouse, pen, trackball, touch screen, or game controller, a voice input device, a scanning device, a digital camera, or another device that provides input to the computing environment 1000. The output device(s) 1060 may be a display, printer, speaker, or another device that provides output from the computing environment 1000.

The communication connection(s) 1070 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 1000, computer-readable media include memory 1020, storage 1040, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A computer implemented method executed by one or more computing devices for detecting one or more symptoms and determining an optimal remedy pattern for one or more faulty components of a faulty device, the method comprising:
   detecting the one or more symptoms in the faulty device that are occurring due to the one or more faulty components in the faulty device;
   identifying the one or more faulty components from a plurality of components of the system based on the detected one or more symptoms;
   performing one or more tests for each identified faulty component to confirm the one or more faulty components and to check status of the faulty device;
   extracting historical data stored in a database; and
   determining the optimal remedy pattern for the identified one or more faulty components based on:
   the extracted historical data;
   cost information;
   a remedy cost without testing; and
   a remedy cost with testing.

2. The method of claim 1, further comprising remedying the one or more faulty components following the optimal remedy pattern.

3. The method of claim 2, further comprising:
   checking the status of the faulty device after remedying every faulty component among the one or more faulty components following the optimal remedy pattern.

4. The method of claim 1, wherein the historical data comprises:
the one or more symptoms;
the one or more faulty components associated with each of the symptoms;
one or more remedy patterns corresponding to the one or more symptoms; and
the optimal remedy pattern used on the one or more faulty components.

5. The method of claim 1, wherein the cost information comprises one or more of:
a renew cost;
an observation cost for the plurality of components;
an observation cost of the faulty device; and
an investigation cost.

6. The method of claim 1, wherein the one or more symptoms are detected based on sensor data associated with the components of the faulty device using one or more measurement error models.

7. A computer implemented method executed by one or more computing devices for determining an optimal remedy pattern for one or more faulty components of a faulty device, the method comprising:
receiving one or more symptoms identified in the faulty device;
identifying one or more faulty components associated with each of the one or more symptoms;
determining status of the faulty device by a probabilistic engine;
computing a remedy cost with testing and a remedy cost without testing based on cost information of the system;
determining the optimal remedy pattern using the remedy cost with testing, provided the remedy cost with testing is less than the remedy cost without testing;
determining the optimal remedy pattern using the remedy cost without testing, provided the remedy cost with testing is more than the remedy cost without testing; and
updating historical data of the probabilistic engine with the determined optimal remedy pattern.

8. The method of claim 7, wherein the cost information comprises one or more of:
a renew cost;
an observation cost for the plurality of components;
an observation cost of the faulty device; and
an investigation cost.

9. The method of claim 7, wherein the probabilistic engine is configured to store information comprising:
one or more faulty device details;
domain knowledge; and
the historical data of one or more components of the faulty device.

10. The method of claim 7, further comprising:
remedying the one or more faulty components following the optimal remedy pattern.

11. A remedy system for detecting symptoms and determining optimal remedy pattern for one or more faulty components of a faulty device, the remedy system comprising:
a symptoms detection and analysis module configured to:
detect one or more symptoms in the faulty device that are occurring due to the one or more faulty components in the faulty device;
determine the one or more faulty components from a plurality of components of the faulty device based on the detected one or more symptoms;
provide the detected one or more symptoms and the determined one or more faulty components to an optimal remedy pattern module;
an activity discovery module configured to:
extract historical data of the faulty device stored in a database and send the historical data to the optimal remedy pattern module;
a testing module configured to:
perform one or more tests for each determined faulty component to confirm the one or more faulty components and to check status of the faulty device; and
the optimal remedy pattern module configured to:
determine the optimal remedy pattern for the detected one or more symptoms based on:
the extracted historical data;
a cost information;
a remedy cost without testing; and
a remedy cost with testing.

12. The remedy system of claim 11, wherein the remedy system further comprises:
an action module configured to:
remedy the one or more faulty components following the optimal remedy pattern.

13. The remedy system of claim 12, wherein the action module is further configured to:
check the status of the faulty device after remedying every faulty component among the one or more faulty components following the optimal remedy pattern.

14. A optimal remedy pattern system comprising:
a probabilistic engine configured to:
receive one or more symptoms identified in a faulty device;
identify one or more faulty components associated with the each symptom;
determine the faulty device status;
a calculating module configured to:
compute a remedy cost with testing and a remedy cost without testing based on cost information of the faulty device;
a processing module configured to:
determine the optimal remedy pattern using the remedy cost with testing provided the remedy cost with testing is less than the remedy cost without testing; and
determine the optimal remedy pattern using the remedy cost without testing provided the remedy cost with testing is more than the remedy cost without testing; and
a remedying module configured to:
update historical data of the probabilistic engine with the determined optimal remedy pattern.

15. The optimal remedy pattern system of claim 14, wherein the cost information comprises one or more of:
a renew cost;
an observation cost for the plurality of components;
an observation cost of the faulty device; and
an investigation cost.

16. The optimal remedy pattern system of claim 14, wherein the probabilistic engine is configured to store information comprising:
one or more faulty device details;
domain knowledge; and
the historical data of one or more components of the faulty device.

17. The optimal remedy pattern system of claim 14, wherein the remedying module is further configured to:
remedy the one or more faulty components following the optimal remedy pattern.

18. A computer program product comprising a non-transitory computer usable medium having a computer readable program code embodied therein for detecting one or more symptoms and determining an optimal remedy pattern for one or more faulty components of a faulty device, the product comprising:
- program code adapted for detecting the one or more symptoms in the faulty device that are occurring due to the one or more faulty components in the faulty device;
- program code adapted for identifying the one or more faulty components from a plurality of components of the system based on the detected one or more symptoms;
- program code adapted for performing one or more tests for each identified faulty component to confirm the one or more faulty components and to check status of the faulty device;
- program code adapted for extracting historical data stored in a database; and
- program code adapted for determining the optimal remedy pattern for the identified one or more faulty components based on:
- the extracted historical data;
- cost information;
- a remedy cost without testing; and
- a remedy cost with testing.

19. The product of claim 18, wherein the historical data comprises:
- the one or more symptoms;
- the one or more faulty components associated with each of the symptoms;
- one or more remedy patterns corresponding to the one or more symptoms; and the optimal remedy pattern used on the one or more faulty components.

20. The product of claim 18, further comprising:
- program code adapted for remedying the one or more faulty components following the optimal remedy pattern.

21. The product of claim 18, further comprising:
- program code adapted for checking the status of the faulty device after remedying every faulty component among the one or more faulty components following the optimal remedy pattern.

22. The product of claim 18, wherein the cost information comprises one or more of:
- a renew cost;
- an observation cost for the plurality of components;
- an observation cost of the faulty device; and
- an investigation cost.

23. The product of claim 18, wherein the one or more symptoms are detected based on sensor data associated with the components of the faulty device using one or more measurement error models.

24. A computer program product comprising a non-transitory computer usable medium having a computer readable program code embodied therein for determining an optimal remedy pattern for one or more faulty components of a faulty device, the product comprising:
- program code adapted for receiving one or more symptoms identified in the faulty device;
- program code adapted for identifying one or more faulty components associated with each of the one or more symptoms;
- program code adapted for determining status of the faulty device by a probabilistic engine;
- program code adapted for computing a remedy cost with testing and a remedy cost without testing based on cost information of the system;
- program code adopted for determining the optimal remedy pattern using the remedy cost with testing, provided the remedy cost with testing is less than the remedy cost without testing;
- program code adapted for determining the optimal remedy pattern using the remedy cost without testing, provided the remedy cost with testing is more than the remedy cost without testing; and
- program code adapted for updating historical data of the probabilistic engine with the determined optimal remedy pattern.

25. The product of claim 24, further comprising:
- remedying the one or more faulty components following the optimal remedy pattern.

26. The product of claim 24, wherein the cost information comprises one or more of:
- a renew cost;
- an observation cost for the plurality of components;
- an observation cost of the faulty device; and
- an investigation cost.

27. The product of claim 24, wherein the probabilistic engine is configured to store information comprising:
- one or more faulty device details;
- domain knowledge; and
- the historical data of one or more components of the faulty device.

* * * * *